(12) United States Patent
Ahmed et al.

(10) Patent No.: US 11,533,195 B2
(45) Date of Patent: *Dec. 20, 2022

(54) BUILDING MANAGEMENT SYSTEM WITH AUTOMATIC EQUIPMENT DISCOVERY AND FUNCTION EXTENSION

(71) Applicant: Johnson Controls Tyco IP Holdings LLP, Milwaukee, WI (US)

(72) Inventors: Jameel Ahmed, Milwaukee, WI (US); Vivek V. Gupta, Shorewood, WI (US); Brandon A. Sloat, New Berlin, WI (US); Daniel F. Leising, New Berlin, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/397,690

(22) Filed: Jan. 3, 2017

(65) Prior Publication Data

US 2018/0191521 A1    Jul. 5, 2018

(51) Int. Cl.
| | |
|---|---|
| G06F 15/173 | (2006.01) |
| H04L 12/40 | (2006.01) |
| G05B 19/042 | (2006.01) |
| H04L 12/28 | (2006.01) |

(52) U.S. Cl.
CPC ............ *H04L 12/40* (2013.01); *G05B 19/042* (2013.01); *H04L 12/2809* (2013.01); *G05B 2219/25011* (2013.01); *H04L 2012/4026* (2013.01)

(58) Field of Classification Search
CPC .......................... H04L 12/40; H04L 12/2809
See application file for complete search history.

(56) References Cited

U.S. PATENT DOCUMENTS

| 9,021,462 | B2 | 4/2015 | Gupta | |
|---|---|---|---|---|
| 2004/0261109 | A1* | 12/2004 | Takagi | H04L 12/2805 725/74 |
| 2007/0055759 | A1* | 3/2007 | McCoy | G05B 19/042 709/223 |

OTHER PUBLICATIONS

U.S. Appl. No. 14/735,955, filed Jun. 10, 2015, Johnson Controls Technology Company.

(Continued)

*Primary Examiner* — Hua Fan
(74) *Attorney, Agent, or Firm* — Foley & Lardner LLP

(57) ABSTRACT

A building management system includes a communications bus, subordinate devices connected to the communications bus, and a controller connected to the communications bus. The controller includes an active node table including a plurality of nodes, each node representing one of the subordinate devices connected to the communications bus. The controller is configured to monitor the active node table for a newly connected subordinate device, use a set of rules to determine whether the newly connected subordinate device is supported by the controller for performing an identified function in combination with the controller, and, in response to a determination that the newly connected subordinate device is supported, extend the identified function of the controller to the newly connected subordinate device. Extending the identified function includes enabling the newly connected subordinate device to perform the identified function.

22 Claims, 9 Drawing Sheets

(56) References Cited

OTHER PUBLICATIONS

U.S. Appl. No. 14/863,219, filed Sep. 23, 2015, Johnson Controls Technology Company.
U.S. Appl. No. 15/008,329, filed Jan. 27, 2016, Johnson Controls Technology Company.
U.S. Appl. No. 15/179,894, filed Jun. 10, 2016, Johnson Controls Technology Company.

* cited by examiner

BUILDING MANAGEMENT SYSTEM WITH AUTOMATIC EQUIPMENT DISCOVERY AND FUNCTION EXTENSION

BACKGROUND

The present disclosure relates generally to the field of heating, ventilation, and air conditioning (HVAC) control systems. The present disclosure relates more particularly to systems and methods for automatic detection and extension of functionality between primary and subordinate controllers and devices in an HVAC control system.

HVAC control systems are used to monitor and control temperature, humidity, air flow, air quality, and/or other conditions within a building or building system. HVAC control systems typically include a plurality of measurement devices (e.g., temperature sensors, pressure sensors, flow sensors, etc.), control devices (e.g., chillers, boilers, air handling units, variable air volume units, etc.), and a controller for receiving feedback from the measurement devices and providing a control signal to the control devices. Some HVAC control systems include a main controller and one or more auxiliary, or subordinate, controllers.

Current methods of preparing and/or equipping a network of HVAC devices (a process also referred to as "provisioning") require considerable resources and effort to update the firmware and/or configuration settings on a plurality HVAC devices. For example, current provisioning methods typically require a service technician to update each controller independently or require the use of complex PC-based tools. These PC-based tools often rely on a secondary communications network (e.g., wired networks, the Internet, a cellular communications network, etc.) and are often difficult to utilize at the location of the HVAC control system (e.g., a rooftop, a basement, a remote location, etc.). In addition, systems and methods to monitor, support, and control multiple subordinate controllers and equipment from a single main controller would be useful.

SUMMARY OF THE INVENTION

One implementation of the present disclosure is a building management system. The building management system includes a communications bus, subordinate devices connected to the communications bus, and a controller connected to the communications bus. The controller includes an active node table including a plurality of nodes, each node representing one of the subordinate devices connected to the communications bus. The controller is configured to monitor the active node table for a newly connected subordinate device, use a set of rules to determine whether the newly connected subordinate device is supported by the controller for performing an identified function in combination with the controller, and, in response to a determination that the newly connected subordinate device is supported, extend the identified function of the controller to the newly connected subordinate device. Extending the identified function includes enabling the newly connected subordinate device to perform the identified function.

In some embodiments, the newly connected subordinate device is a sensor, an actuator, a thermostat, an input/output module, or a rooftop unit. In other embodiments, the newly connected subordinate device is a subordinate controller configured to operate at least one secondary subordinate device.

In some embodiments, the communications bus is a component of a BACnet network.

In some embodiments, the identified function of the controller is a provisioning function, a control function, a fault detection function, a security function, an energy optimization function, or a data logging function.

In some embodiments, the controller is configured to identify the controller and the newly connected subordinate device as a single controller to the building management system, a cloud service, or a USB device.

In some embodiments, the set of rules includes a rule for determining whether the controller and the subordinate device have a common manufacturer. In other embodiments, the set of rules includes a rule for determining whether the controller and the subordinate device have a common version.

Another implementation of the present disclosure is a method for extending identified functions of a controller to subordinate devices in a building management system. The method includes monitoring an active node table for a newly connected subordinate device on a communications bus of the building management system, determining, using a set of rules regarding supported devices, whether the newly connected subordinate device is supported by the controller for performing an identified function in combination with the controller, and, in response to a determination that the newly connected subordinate device is supported, extending the identified function of the controller to the newly connected subordinate device. Extending the identified function includes enabling the newly connected subordinate device to perform the identified function.

In some embodiments, the newly connected subordinate device is a sensor, an actuator, a thermostat, an input/output module, or a rooftop unit. In other embodiments, the newly connected subordinate device is a subordinate controller configured to operate at least one secondary subordinate device.

In some embodiments, the communications bus is a component of a BACnet network.

In some embodiments, the identified function of the controller is a provisioning function, a control function, a fault detection function, a security function, an energy optimization function, or a data logging function.

In some embodiments, the controller is configured to identify the controller and the newly connected subordinate device as a single controller to the building management system, a cloud service, or a USB device.

In some embodiments, the set of rules includes a rule for determining whether the controller and the subordinate device have a common manufacturer. In other embodiments, the set of rules includes a rule for determining whether the controller and the subordinate device have a common version.

Another implementation of the present disclosure is another method for extending identified functions of a controller to subordinate devices in a building management system. The method includes reading device attributes from a connected subordinate device. The device attributes include a manufacturer device attribute and a firmware status device attribute. The method further includes extending an identified function of the controller to the connected subordinate device in response to a determination, based on the manufacturer device attribute, that the controller and the connected subordinate device have a common manufacturer, or a determination, based on the firmware status device attribute, that the firmware of the connected subordinate device supports the identified function of the controller.

Extending the identified function includes enabling the connected subordinate device to perform the identified function.

In some embodiments, the identified function of the controller is a provisioning function, a control function, a fault detection function, a security function, an energy optimization function, or a data logging function. In other embodiments, the provisioning function is installing a firmware update, installing an application update, or transmitting a configuration setting.

In some embodiments, the connected subordinate device is a sensor, an actuator, a thermostat, an input/output module, or a rooftop unit.

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Overview

Referring generally to the FIGURES, a building management system (BMS) with automatic equipment discovery and function extension, otherwise referred to as smart equipment plug and play (SE-PnP) is shown, according to some embodiments. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS described herein provides a system architecture that facilitates automatic equipment discovery and the extension of functions and features (e.g., provisioning functions, control functions, fault detection functions, data logging functions) from a primary controller to multiple subordinate controllers and devices. Equipment discovery may be accomplished using active node tables, which provide status information for devices connected to a particular communications bus, or through a pinging state machine, which identifies connected devices that are otherwise undiscoverable using active node tables. Once the subordinate devices are identified, an SE-PnP module within the BMS primary controller determines whether to establish communications monitoring links with the discovered equipment based on certain equipment attributes. After a communications monitoring link is established, the SE-PnP module extends features and functionality to the discovered equipment.

Building and HVAC System

Figure 1:
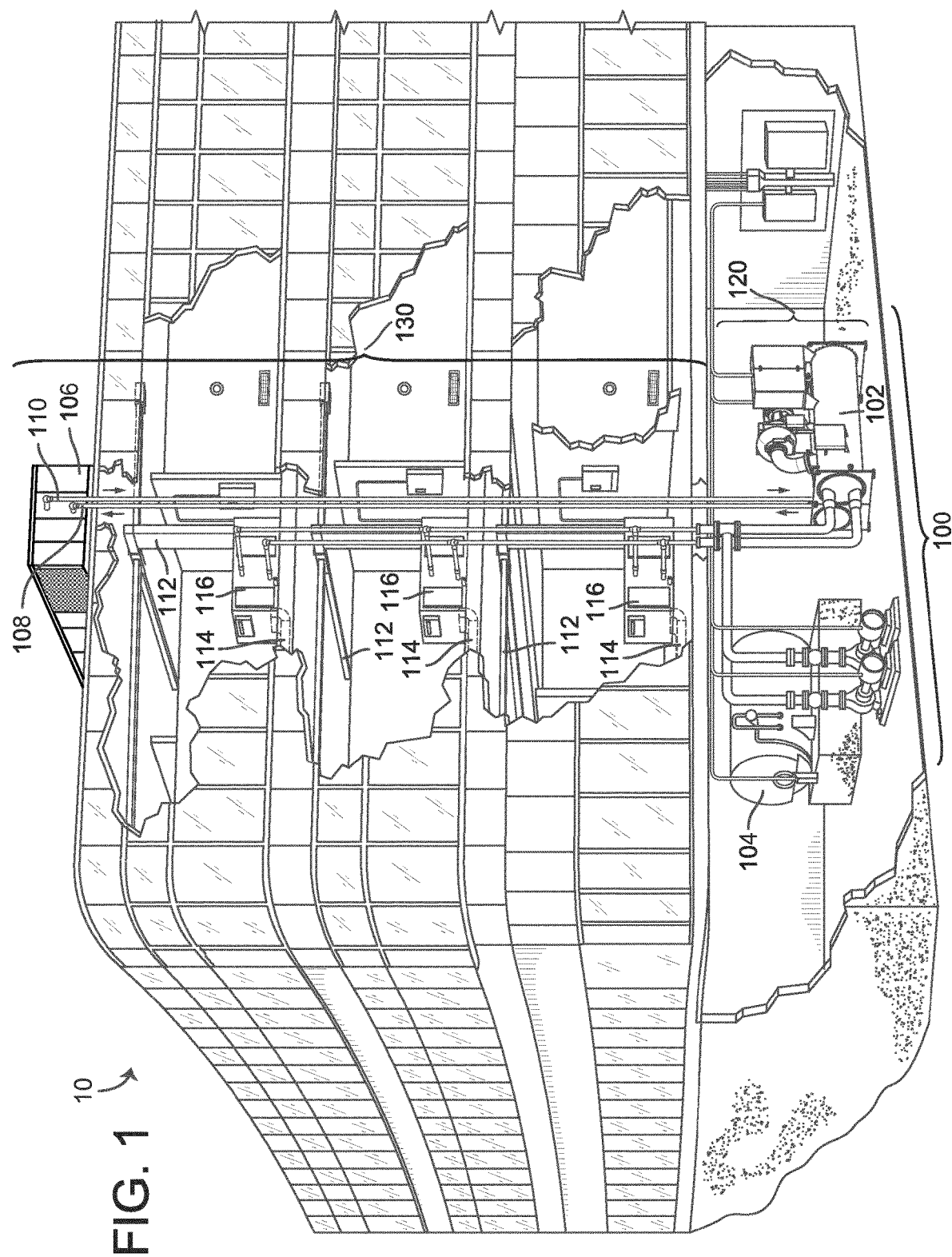
FIG. 1 is a drawing of a building equipped with a heating, ventilating, and air conditioning (HVAC) system, according to some embodiments.

Referring now to FIG. 1, an exemplary building and HVAC system in which the systems and methods of the present disclosure can be implemented is shown, according to an exemplary embodiment. In FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Building Management System

Figure 2:
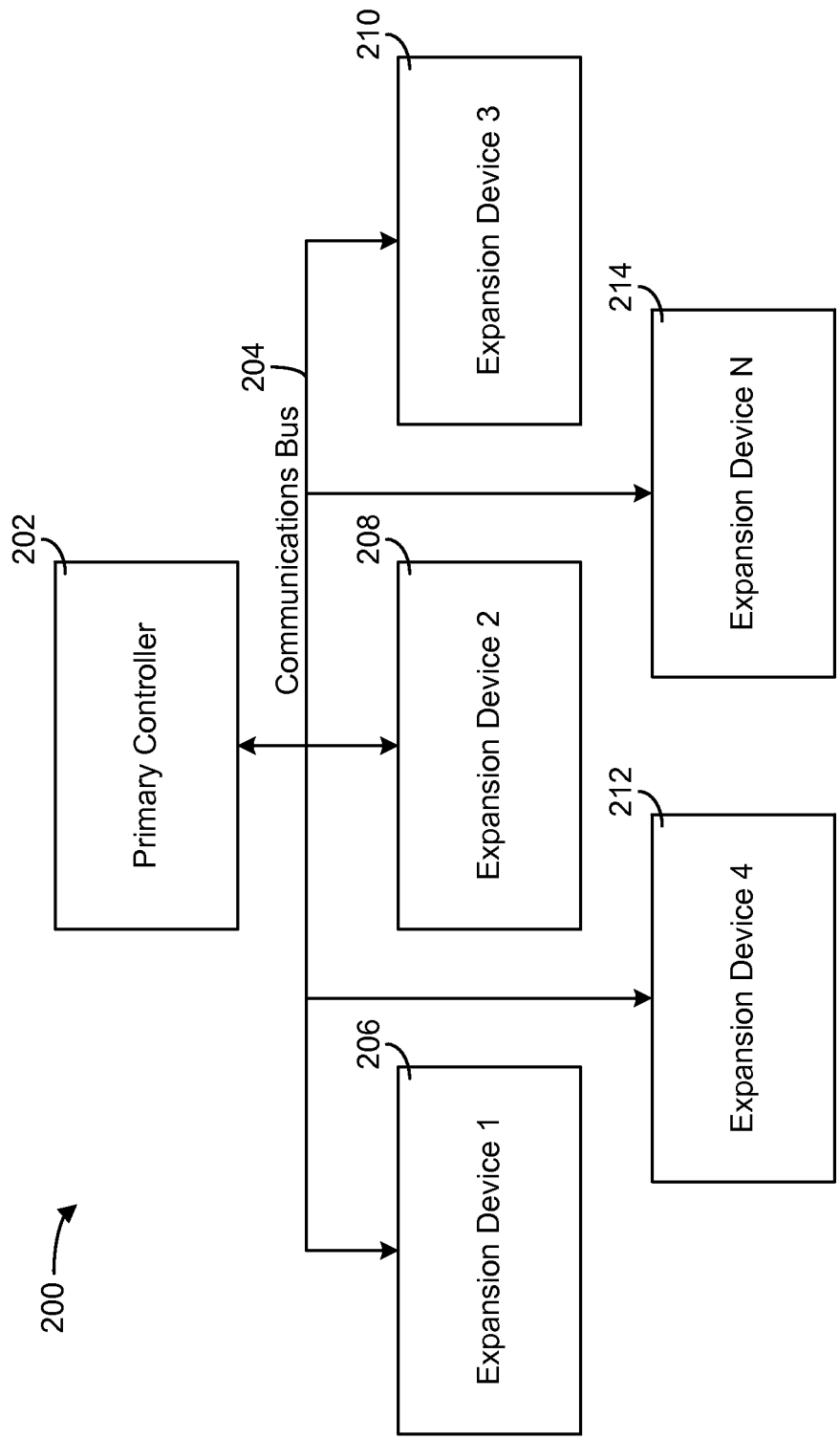
FIG. 2 is a block diagram of a building management system (BMS) which can be used to monitor and control the building and HVAC system of FIG. 1, according to some embodiments.

Referring now to FIG. 2, a block diagram of a building management system (BMS) 200 is shown, according to an exemplary embodiment. A BMS is, in general, a system of devices configured to control, monitor, and manage equipment in or around a building or building area. BMS 200 is shown to include primary controller 202 and several expansion devices 206-214. In various embodiments, expansion devices 206-214 may be sensors, actuators, thermostats, economizers, rooftop units (RTUs), expansion input/output (IO) modules, or any other suitable HVAC equipment. In some embodiments, expansion devices 206-214 may include other primary controllers that optionally include connected subordinate devices. Primary controller 202 may communicate with expansion devices 206-214 via communications bus 204. In some embodiments, the communications bus 204 is a sensor actuator (SA) communications bus, and communications over bus 204 are sent via BACnet master slave token passing (MSTP) protocol.

In some embodiments, expansion devices 206-214 receive information from primary controller 202 (e.g., commands, setpoints, operating boundaries) and provide information to primary controller 202. For example, expansion devices 206-214 can provide primary controller 202 with temperature measurements from temperature sensors, equipment on/off states, equipment operating capacities, and/or any other information that can be used by primary controller 202 to monitor or control a variable state or condition within a building.

Figure 3:
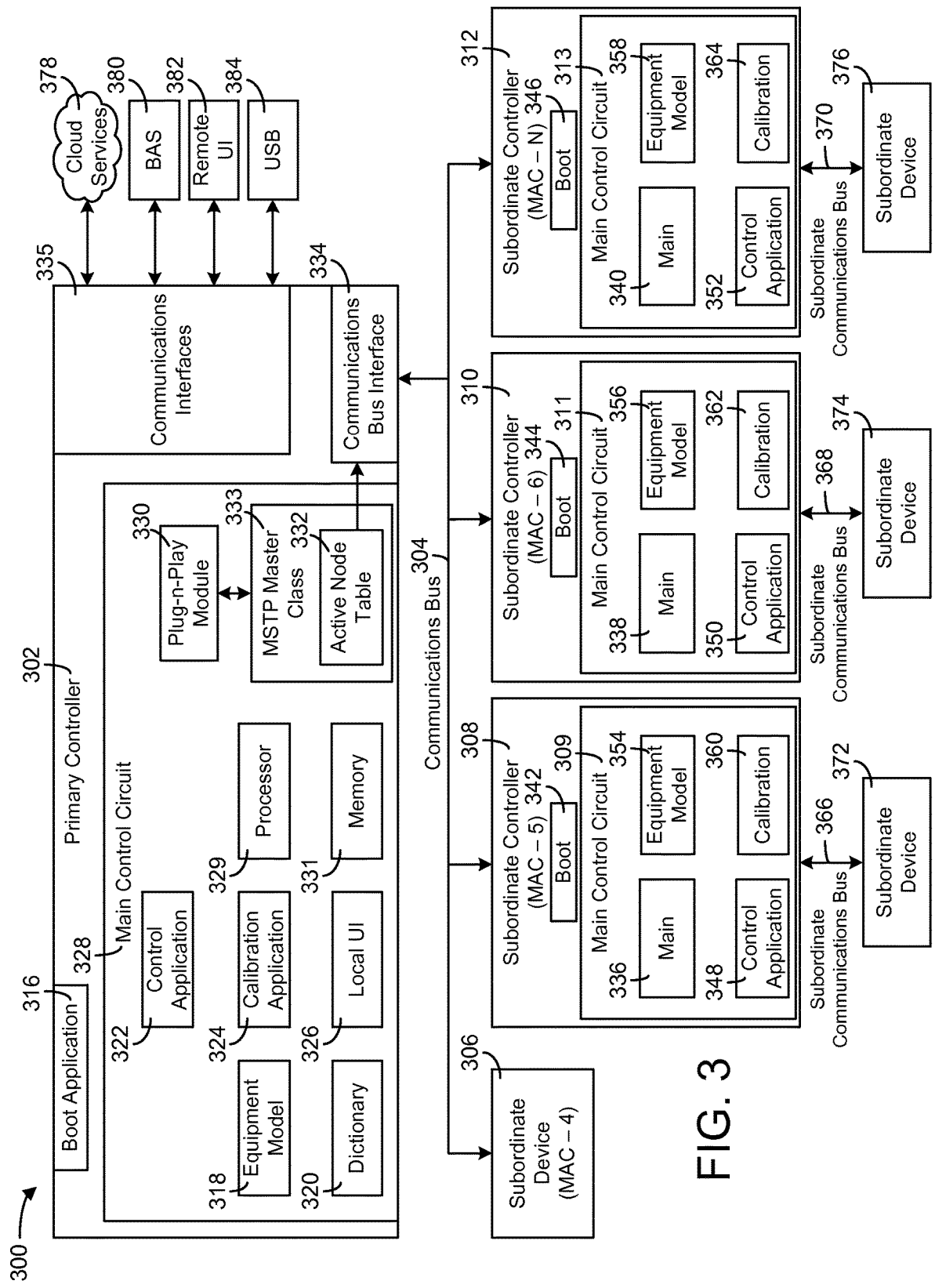
FIG. 3 is a block diagram illustrating the BMS of FIG. 2 in greater detail, according to some embodiments.

Referring now to FIG. 3, a block diagram of another BMS 300 is shown, according to an exemplary embodiment. BMS 300 may be a more detailed version of BMS 200. For example, BMS 300 is shown to include primary controller 302, which may be the same as primary controller 202 or similar to primary controller 202 in BMS 200. In some embodiments, primary controller 302 is coupled via communications bus 304 to subordinate devices and controllers 306-312. Subordinate devices and controllers 306-312 are examples of various expansion devices 206-214 which can be used in BMS 200. Communications bus 304 may be the same as communications bus 204 or similar to communications bus 204 in BMS 200. Primary controller 302 is shown to include a boot application 316, a main control circuit 328, a communications bus interface 334, and communications interfaces 335.

Boot application 316 may contain code used to initialize the hardware of primary controller 302. Main control circuit 328 is shown to include equipment model 318, dictionary 320, control application 322, calibration application 324, and local UI 326. Equipment model 318 may define the equipment object attributes, view definitions, schedules, trends, and the associated value objects for primary controller 302 (e.g., analog value, binary value, multistate value, etc.) that are used for integration with other systems. Dictionary 320 may store definitions related to the equipment or equipment model. Control application 322 may store instructions related to control of the main functions of primary controller 302, while calibration application 324 stores instructions related to device calibration. Local UI 326 may store data and instructions related to the way a user or technician interacts with primary controller 302 (e.g., display screens, menus, etc.).

Main control circuit 328 of primary controller 302 is further shown to include a processor 329, a plug-n-play module 330, memory 331, and an MSTP master class module 333. Processor 329 can be implemented as a general purpose processor, an application specific integrated circuit (ASIC), one or more field programmable gate arrays (FPGAs), a group of processing components, or other suitable electronic processing components. Memory 331 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 331 may be or include volatile memory or non-volatile memory. Memory 331 may include database components, object code components, script components, or any other type of information structure for supporting the various activities and information structures described in the present application. According to an exemplary embodiment, memory 331 is communicably connected to processor 329 via main control circuit 328 and includes computer code for executing (e.g., by main control circuit 328 and/or processor 329) one or more processes described herein.

Still referring to FIG. 3, plug-n-play module 330 can be configured to perform smart equipment plug and play (SE-PnP) functions. Described in greater detail with reference to FIGS. 4 and 6-8 below, plug-n-play module 330 can be configured to identify connected subordinates, determine support for these subordinates based on criteria stored in memory 331, establish communication monitoring links from the primary controller to the subordinate devices, and extend functions to supported subordinates. Plug-n-play module 330 can be communicably coupled to MSTP master class module 333 within main control circuit 328. In some embodiments, MSTP master class module 333 manages active node table 332 and is configured to manage communications between active node table 332 and the other components of main control circuit 328. For example, plug-n-play module 330 may receive data from active node table 332 via attributes (e.g., ACTIVE_NODE_TABLE_ATTR and ACTIVE_NODE_TABLE_CHANGE_COUNTER_ATTR) of MSTP master class module 333. Active node table 332 can provide status information for devices communicating on a particular bus. For example, active node table 332 can provide status information for any devices connected that communicate on communications bus 304 using the MSTP master protocol.

Primary controller 302 may communicate with subordinate devices and controllers 306-312 via communications bus 304. Specifically, main control circuit 328 may be communicably connected to communications bus 304 via communications bus interface 334. As described above, in some embodiments, communications bus 304 is a sensor actuator (SA) communications bus, and communications over the bus are sent via BACnet master slave token passing (MSTP) protocol. In other embodiments, communications are sent using a different type of communications bus and/or using a different type of communications protocol. For example, a field controller (FC) communications bus may permit primary controller 302 to connect with other primary controllers (e.g., other instances of primary controller 302) and with subordinate controllers 308-312. Communications protocols which can be used by communications bus 304 include, for example, BACnet IP, BACnet MSTP, CAN, Modbus, USB, Firewire, UART, SPI, RS-485, etc.

Each subordinate device and controller 306-312 may have a unique device identifier that may be used by active node table 332 to identify devices communicating on communications bus 304. In some embodiments, the unique device identifier is a MAC address (e.g., as shown in FIG. 3, subordinate device 306 has a MAC address of 4, while subordinate controller 308 has a MAC address of 5). Subordinate controllers 308-312 may control subordinate devices 372-376 (e.g., sensors, actuators, thermostats, economizers, RTUs) via subordinate communications buses 366-370. In some embodiments, subordinate communications buses 366-370 operate using the same type of bus and protocols as communications bus 304. In other embodiments, buses 304 and 366-370 operate using different types of busses and communications protocols. Each subordinate controller 308-310 may include, among other components, boot code 342-346, and main control circuits 309-311. Each of the main control circuits 309-311 may include control applications 348-352, equipment models 354-358, and calibration code 360-364. Each of the these components may be configured to perform identical or substantially similar functions as the analogous components of primary controller 302.

Primary controller 302 of BMS 300 is further shown to include communications interfaces 335 that provide a means to connect to several external devices and services, including cloud services 378, a building automation system (BAS) 380, a remote UI 382, and a USB device 384. In various embodiments, communications interfaces 335 may include wired or wireless connections to the external devices using a variety of communications protocols (e.g., Ethernet, WiFi, BAS communications bus). When the SE-PnP feature is enabled, primary controller 302, along with all of its subordinate controllers and devices (e.g., subordinate controllers 308, 310, 312, subordinate devices 306, 372-376) appear as a single controller to these external devices and services. This may be advantageous, for example, when using a cloud service to access and/or control primary controller 302, as the plug and play functionality permits a user to control each of the subordinate devices directly or indirectly connected to primary controller 302 as well.

Automatic Equipment Discovery

Figure 4:
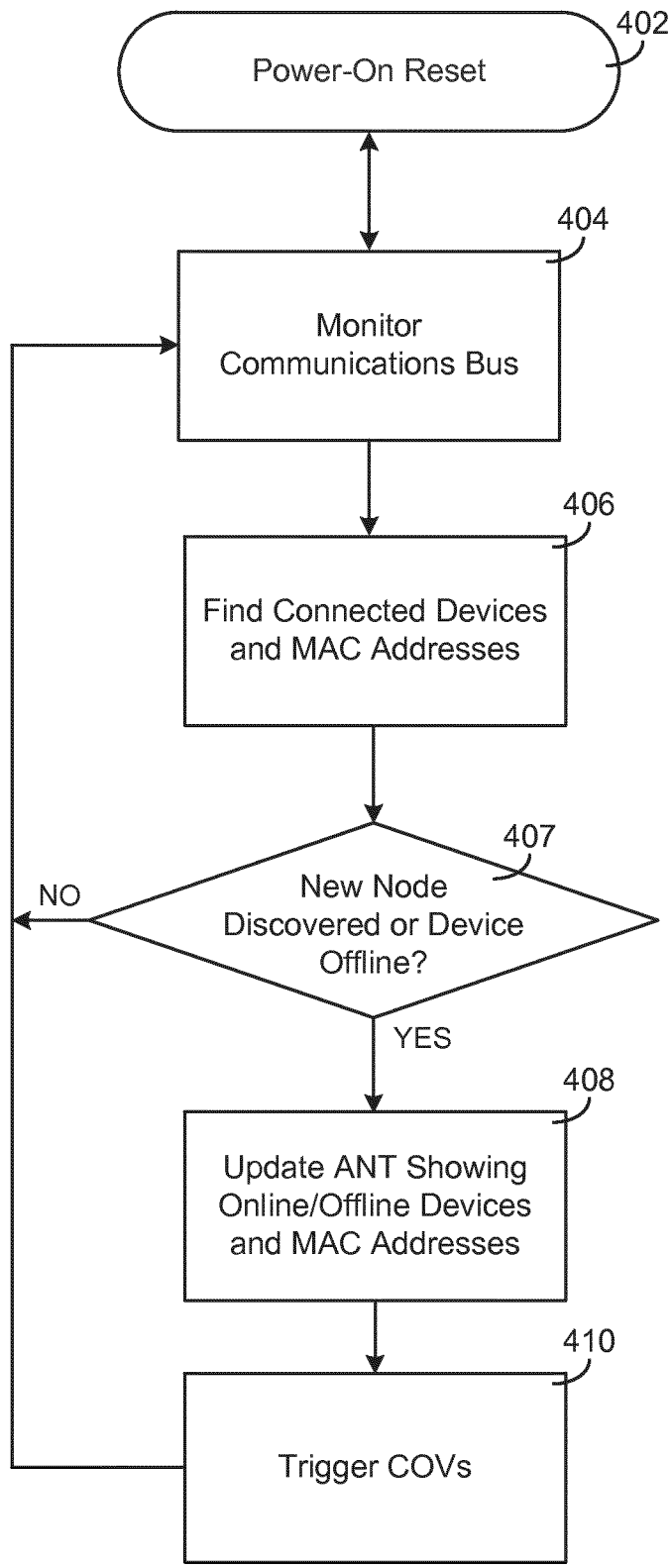
FIG. 4 is a flow diagram illustrating a technique which can be used by the primary BMS controller of FIGS. 2-3 to automatically discover subordinate BMS equipment, according to some embodiments.

Referring now to FIG. 4, a flowchart of a process 400 for automatically discovering equipment in a building management system is shown, according to an exemplary embodiment. Process 400 may alternatively be referred to as a refresh process for the active node table (ANT). Process 400 can be performed by one or more components of BMS 300. In some embodiments, process 400 is performed by plug-n-play module 330 of main control circuit 328 in communication with MSTP master class 333 and active node table 332 as described with reference to FIG. 3. Process 400 can be used to automatically discover subordinate devices communicating on communications bus 304. In some embodiments, the process of discovering subordinate devices through monitoring of an active node table is the same or similar to the process described in U.S. patent application Ser. No. 15/179,894 filed Jun. 10, 2016, the entire disclosure of which is incorporated by reference herein. Once the devices have been discovered, processes 700 and 800 (described in greater detail below) can be used to extend functionality and control features to the subordinate devices.

Process 400 is shown to include performing a power-on reset at step 402. During the power-on reset, primary controller 302 receives power and the components of main control circuit 328 begin monitoring communications bus 304. From there, process 400 is shown to continue by monitoring communications bus 304 for new or changing nodes (step 404). Each node in active node table 332 can represent a device communicating on communications bus 304. At step 406, MSTP master class 333 identifies connected devices and their MAC addresses.

At step 407, MSTP master class 333 determines if any new nodes have been discovered or if any previously connected devices have gone offline. If a newly connected device (i.e., a node) is not discovered and a previously connected device has not gone offline, process 400 may proceed to revert to step 404. However, if the devices connected to communications bus 304 have changed, MSTP master class 333 updates active node table 332 at step 408 to reflect this information. When active node table 332 is changed, a change of value (COV) notification may be transmitted or a change counter attribute may be incremented. In some embodiments, step 408 may include plug-n-play module 330 reading attributes (e.g., ACTIVE_NODE_TABLE_ATTR) from MSTP master class 333 upon receiving a COV notification. In other embodiments, other objects or devices within BMS 300 interested in the status of active node table 332 can also subscribe to the receive COV notifications from active node table 332. Process 400 concludes by reverting to step 404 to continue monitoring communications bus 304 for changes in connected device status.

Figure 5:
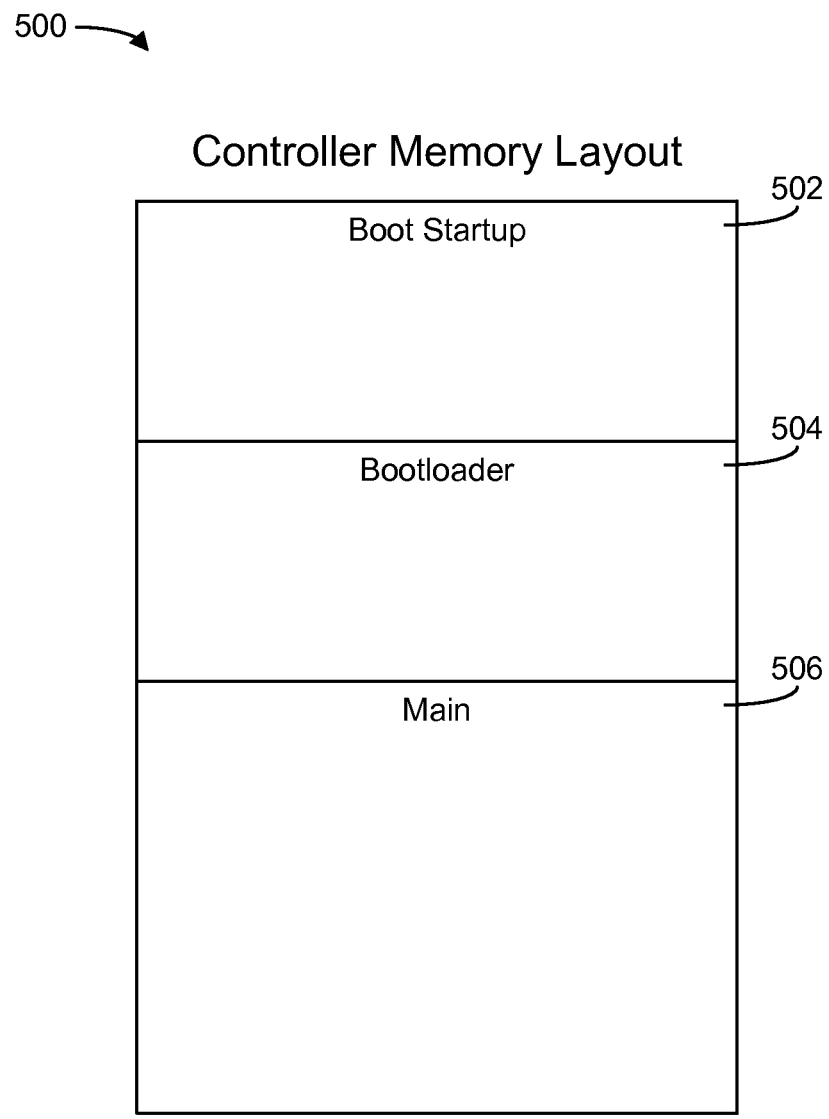
FIG. 5 is a block diagram illustrating the firmware architecture of HVAC devices, according to some embodiments.
Figure 6:
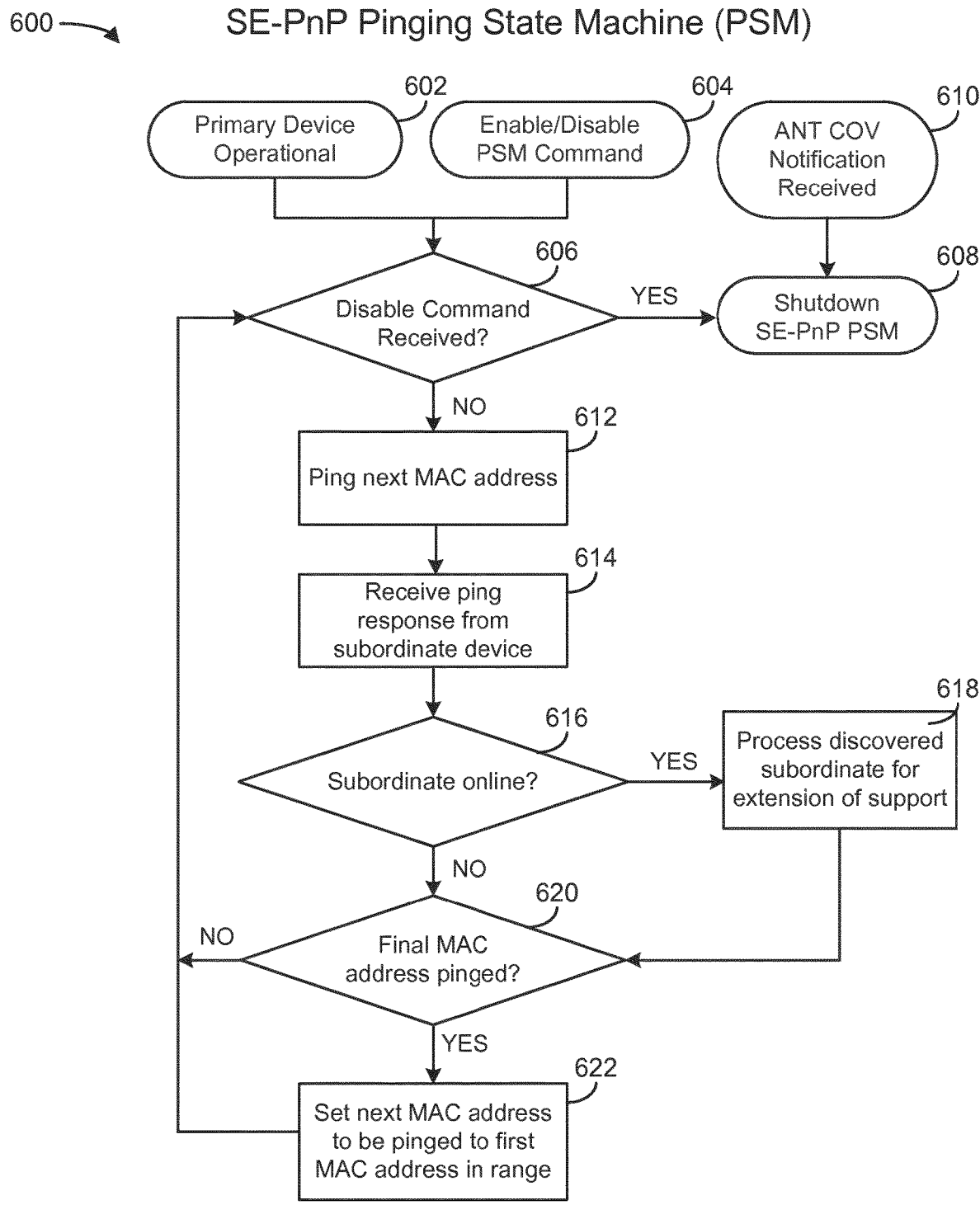
FIG. 6 is a flow diagram illustrating another technique which can be used by the primary BMS controller of FIGS. 2-3 to automatically discover subordinate BMS equipment, according to some embodiments.

Referring now to FIG. 5-6, a block diagram 500 depicting a tiered firmware architecture and a flowchart 600 depicting an alternate mechanism for automatically discovering equipment in a building management system are shown, according to exemplary embodiments. FIG. 5 depicts a tiered structure utilized by the firmware of certain HVAC devices. In some embodiments, these HVAC devices include subordinate device 306 and/or subordinate controllers 308-312. Boot startup code 502 is responsible for initializing the device hardware and transitioning into bootloader code 504 or main code 506. If boot startup code 502 detects that the device contains no main code 506, or that main code 506 is corrupted, the device transitions into bootloader code 504.

The primary function of bootloader code 504 is to manage the download of main code 506. Main code 506 can be configured to control the device's major functions. A device running bootloader code 504 (i.e., either in the process of or awaiting download of main code 506) may have a status attribute of CODE_DOWNLOAD_REQUIRED or CODE_DOWNLOAD_IN_PROGRESS. A device running bootloader code 504 may have no main code 506 and consequently may act as an MSTP slave device. An MSTP slave device may not be discoverable using the active node table method of process 400, since that method is only available to MSTP master devices. If a subordinate device running bootloader code 504 is connected to the SA bus (i.e., communications bus 304), primary controller 302 may have no knowledge of its presence and may act as if the subordinate device is not connected.

Referring now to FIG. 6, another process 600 for automatically discovering equipment in a building management system is shown, according to an example embodiment. In some embodiments, process 600 is performed to discover equipment which is ordinarily not discoverable using process 400 (e.g., MSTP slave devices). Process 600 may be performed by one or more components of BMS 300 to send a "ping" (i.e., an MSTP low-level test message) to all potential MAC addresses of a subordinate device. Since bootloader code 504 is capable of responding to this type of test message, process 600 allows subordinate devices to be discovered that would otherwise not be found through monitoring of the active node table 332. In some embodiments, process 600 is performed by plug-n-play module 330 of main controller circuit 328. Process 600 may run continuously following the startup of primary controller 202 to discover connected devices that would not otherwise be discoverable using the active node table refresh process 400, as described above with reference to FIG. 4.

Process 600 begins with step 602, in which a primary device (e.g., primary controller 302) becomes operational. Alternatively, process 600 may begin with step 604, in which a command to enable or disable the pinging state machine (PSM) is received at plug-n-play module 330. At step 606, plug-n-play module 330 determines whether a command to disable the pinging state machine has been received. Because the pinging state machine runs continuously during device startup, it may be responsible for a considerable amount of traffic on communications bus 304 (e.g., the SA communications bus). Therefore, to preserve system resources, process 600 may be shut down or temporarily disabled whenever another communication or resource-intensive operation needs to run using communications bus 304. For this reason, when the active node table receives a COV notification from MSTP master class module 333, signaling updates to the active node table (step 610), the pinging state machine can be temporarily disabled or shut down at step 608. In some embodiments, step 608 includes sending a command to disable the pinging state machine (step 604), which is detected in step 606. Process 600 may remain suspended at steps 606-608 until plug-n-play module 330 has completed an active node table refresh, at which point the command to disable the pinging state machine (step 604) may be overwritten or replaced with a command to enable the pinging state machine. Once module 330 has completed the refresh, the pinging state machine may resume pinging the next MAC address, picking up from where it was last disabled.

If plug-n-play module 330 determines in step 606 that a command to disable the pinging state machine has not been received (or has been overwritten with an enable command), process 600 proceeds to step 612, in which the next sequential MAC address is pinged. In some embodiments, the default range of valid MAC addresses for subordinate devices runs from 4-127. In other embodiments, the range of valid MAC addresses may be configurable via a setting in primary controller 302. For example, an installer of primary controller 302 may configure the upper and lower bounds of valid MAC addresses to run from 0-255. At step 614, a ping response is received from a subordinate device. At step 616, plug-n-play module 330 determines whether the subordinate device is online. If the subordinate device is online, process 600 proceeds to step 618, in which plug-n-play module 330 "discovers" the subordinate device.

Described in greater detail with respect to FIG. 8 below, step 618 is the precursor to the establishment of an expansion I/O monitor class (EIOM) instance in primary controller 302 for the supported subordinate. An EIOM instance can be tied to the subordinate device's unique MAC address for the purpose of establishing a communications monitoring link with the subordinate device. The EIOM instance may persist on primary controller 302 so long as the subordinate device associated with the device is connected to communications bus 304 and online. If the subordinate device is disconnected from communications bus 304, its corresponding EIOM instance within primary controller 302 can be deleted.

If the subordinate device is not online in step 616, plug-n-play module 330 may proceed directly to step 620 without performing step 618 to discover a subordinate device at the pinged MAC address. At step 620, plug-n-play module 330 may determine whether the final MAC address (e.g., MAC address 127) in a predetermined range of MAC addresses has been pinged. As described above, the range of valid MAC addresses for subordinate devices may run from 4-127 and plug-n-play module 330 may ping each MAC address sequentially. Therefore, once plug-n-play module 330 has pinged MAC address 127, plug-n-play module 330 may determine that the final MAC address has been pinged. In response to a determination that the final MAC address has been pinged, process 600 may proceed to step 622. In step 622, plug-n-play module 330 may set the next MAC address to be pinged to the first MAC address (e.g., MAC address 4) in the predetermined range of MAC addresses in order to restart the cycle through the full range of valid MAC addresses. If, in step 620, plug-n-play module 330 determines that the final MAC address in the predetermined range was not the most recent MAC address pinged, process 600 may return to step 606. Steps 606-620 can be repeated until the final MAC address has been pinged, at which point step 622 can be performed to reset the next MAC address to be pinged to the first MAC address in the predetermined range. Steps 606-622 can be repeated continuously (unless paused by the disable PSM command in step 604) to discover new devices at any MAC address in the predetermined range.

Smart Equipment Plug and Play (SE-PnP)

Figure 7:
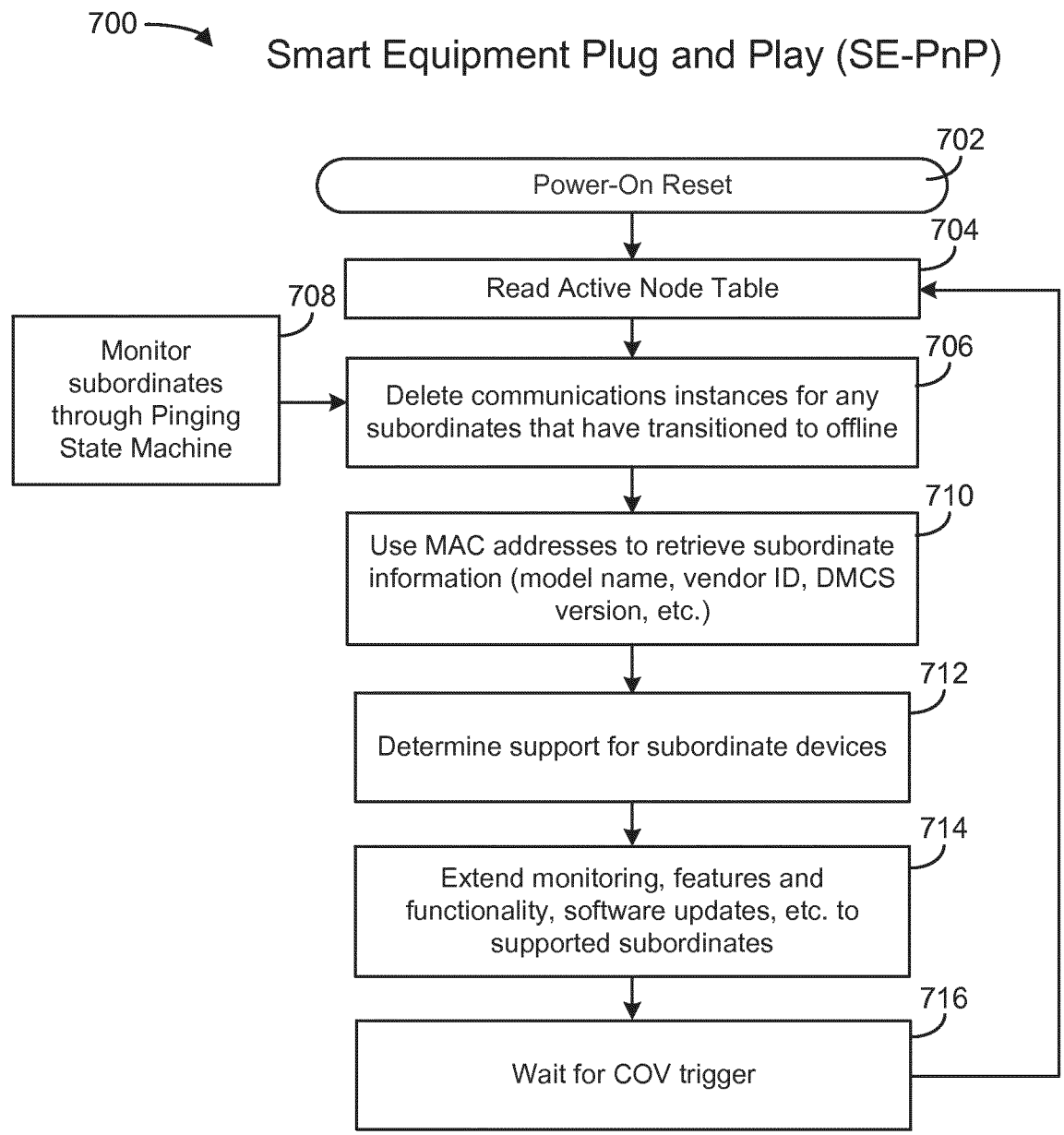
FIG. 7 is a flow diagram illustrating a technique which can be used by the primary BMS controller of FIGS. 2-3 to extend functionality and other features to subordinate BMS equipment, according to some embodiments.

Referring to FIG. 7, a flowchart of a process 700 for extending identified functions to discovered equipment in a building management system is shown, according to an exemplary embodiment. Process 700 may alternatively be referred to as a smart equipment plug and play (SE-PnP) process. Process 700 may be performed by one or more components of BMS 300. In some embodiments, process 700 is performed by main control circuit 328 and/or plug-n-play module 330 as described with reference to FIG. 3. Process 700 can be used to extend a variety of functions from primary controller 302 to subordinate devices and controllers (e.g., subordinate devices 306, 372-376, subordinate controllers 308-312) within BMS 300. In some embodiments, the identified functions capable of being extended from primary controller 302 to the subordinate devices and controllers are fixed (e.g., stored in memory 331 or plug-n-play module 330) when primary controller 302 is installed in the building. In other embodiments, the identified functions capable of being extended may be updated after primary controller 302 is installed.

Process 700 is shown to include performing a power-on reset at step 702. During the power-on reset, primary controller 302 receives power and the components of main control circuit 328 begin monitoring communications bus 304. At step 704, plug-n-play module 330 may read the contents of the refreshed active node table from MSTP master class 333. The active node table can be refreshed by MSTP master class 333 by performing process 400 as described with reference to FIG. 4. At step 706, and as described above, module 330 can delete the communications instances (e.g., EIOM class instances) for any subordinates that have transitioned to an offline mode and are therefore no longer communicating over communications bus 304. This can be accomplished at step 708 through the monitoring of subordinates through the pinging state machine process 600 for MSTP slave devices and process 400 for MSTP master devices, as described with reference to FIGS. 4 and 6.

After deleting any offline subordinates, process 700 continues with step 710, in which plug-n-play module 330 uses the MAC addresses of discovered subordinate devices to retrieve information (i.e., device attributes) regarding the subordinate devices. In some embodiments, this information includes, but is not limited to a device model name, a device vendor ID, and a device version (e.g., a DMCS version, described in further detail below). At step 712, plug-n-play module 330 can determine whether to extend support to the online subordinate devices. In some embodiments, this determination is made by performing a sub-process 800, described in greater detail with reference to FIG. 8.

Process 700 continues with step 714, in which plug-n-play module 330 extends identified functions to supported subordinates. In various embodiments, the identified functions are selected from a database located within or communicably coupled to plug-n-play module 330. In some embodiments, plug-n-play module 330 contains logic configured to determine the functions to extend based on attributes (e.g., manufacturer, firmware status, product family) of the subordinate device.

In some embodiments, step 714 includes the extension of provisioning functions to the subordinate devices. Provisioning is the process of preparing, equipping, upgrading, and/or updating a BMS to provide improved functionality or services to its users. In various embodiments, provisioning functions may include the transmission of firmware, software, or application updates to the subordinate devices (e.g., subordinate devices 306 and 372-376, subordinate controllers 308-312). In some embodiments, primary controller 302 may transmit signals to the subordinate devices to control the installation of these updates. In further embodiments, primary controller 302 may transmit configuration settings to the subordinate devices. Several examples of provisioning functions which can be extended from primary controller 302 to subordinate devices are described in U.S. Pat. No. 9,021,462 granted Apr. 28, 2015, and U.S. patent application Ser. No. 15/008,329 filed Jan. 27, 2016. The entire disclosures of both U.S. Pat. No. 9,021,462 and U.S. patent application Ser. No. 15/008,329 are incorporated by reference herein.

In other embodiments, the extension of identified functions in step 714 includes fault detection functions. In some embodiments, the fault detection functions may include primary controller 302 monitoring subordinate devices (e.g., subordinate devices 306 and 372-376, subordinate controllers 308-312) for faults using device status data transmitted from the subordinate devices to primary controller 302. In other embodiments, the fault detection functions may include primary controller 302 transmitting and installing fault detection modules or applications on the subordinate devices. Using the fault detection modules or applications, the subordinate devices may detect faults and transmit notifications of the faults to primary controller 302. Similarly, in other embodiments, the extension of identified functions in step 714 includes security functions. For example, security functions may include primary controller 302 transmitting and installing security modules or applications on the subordinate devices. Using the security modules or applications, the subordinate devices may detect security events and transmit notifications of the events to primary controller 302.

In still further embodiments, the identified functions of step 714 include data logging functions. In some embodiments, the data logging functions may include primary controller 302 receiving data from subordinate devices (e.g., subordinate devices 306 and 372-376, subordinate controllers 308-312) and logging this data at primary controller 302. In other embodiments, the data logging functions may include primary controller 302 transmitting and installing data logging modules or applications on the subordinate devices. After logging data in the modules or applications, the subordinate devices may transmit data packages or data summary reports to primary controller 302. In some embodiments, the identified functions of step 714 include energy optimization functions. For example, primary controller 302 may transmit and install an energy optimization module or application on a subordinate device to manage the amount of energy consumed by the subordinate device.

In other embodiments, the identified functions of step 714 include communication of control signals, and/or control of the subordinate device through the user interface of the primary controller. In some embodiments, communication of control signals includes selecting a command for a subordinate device to perform within the user interface (e.g., a display screen) of primary controller 302 and transmitting the command to the subordinate device. In still further embodiments, the extension of functionality using plug-n-play module 330 permits the automatic detection of multiple devices on the same network without requiring static configuration (provided all devices on a particular network or port speak the same protocol). Therefore, the SE-PnP process 700 permits the establishment of a gateway between multiple networks speaking different protocols with multiple devices present on each network.

At step 716, process 700 concludes as plug-n-play module 330 determines whether a remote devices information attribute stored within plug-n-play module 330 has received a COV trigger. The remote devices information attribute may list all of the devices (e.g., subordinate devices and controllers 306-312) that are connected to the communications bus 304 and online. If the plug-n-play module 330 has received a COV trigger, process 700 may revert to step 704 and plug-n-play module 330 may read active node table data from MSTP master class module 333.

Figure 8A:
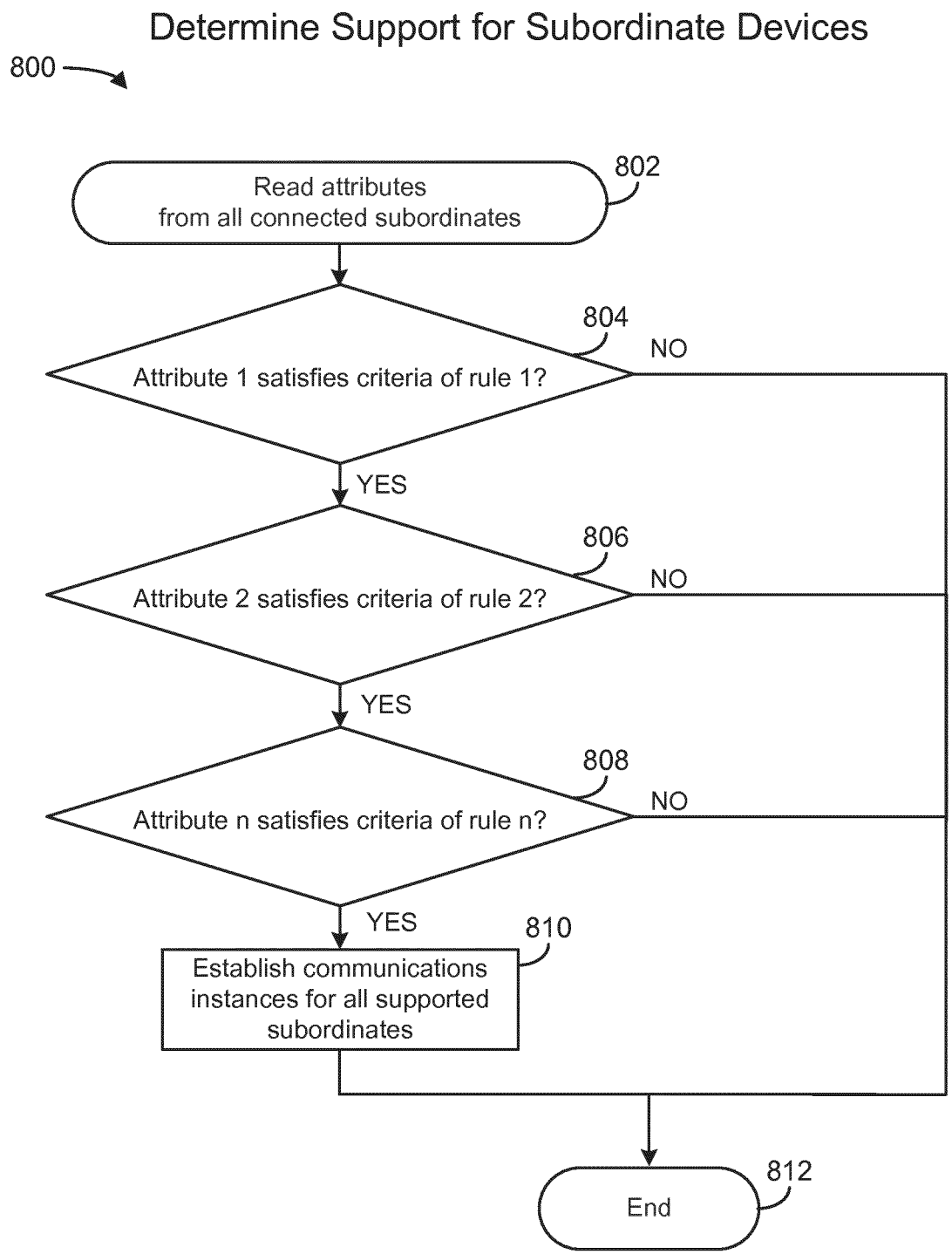
FIG. 8A is a flow diagram illustrating a sub-process of the technique of FIG. 7 used to determine whether to extend support for subordinate devices, according to some embodiments.

Referring now to FIG. 8A, a flowchart of process 800 for determining whether to extend support to a subordinate device is shown, according to an example embodiment. Process 800 may be performed, among other components, by plug-n-play module 330 of primary controller 302. In some embodiments, process 800 is a sub-process of process 700 (i.e., step 712) described with respect to FIG. 7.

Process 800 may commence with step 802, in which plug-n-play module 330 reads attributes from all connected subordinate devices (e.g., subordinate device 306, subordinate controllers 308-312). Attributes may include any characteristic of the subordinate device, including, but not limited to, the type of the device, the version (e.g., firmware version) of the device, and the manufacturer of the device. Though process 800 presents an overview of the process for determining support for subordinate devices, an example of a process performed with reference to specific attributes and rules is included below in FIG. 8B. In some embodiments, the attributes for the subordinate devices are gathered by module 330 at step 710 of process 700. Subordinate devices may be discovered through the active node table refresh of process 400 or the SE-PnP pinging state machine of process 600.

In steps 804, 806, and 808, plug-n-play module 330 may determine if an attribute of a connected subordinate device satisfies the criteria of a rule concerning the attribute. For example, the criteria of a rule may include extending features and functionality contingent on whether the connected subordinate device is of a particular type or has a certain manufacturer. In some embodiments, plug-n-play module 330 may store the rules and determine if and when they are used. For example, in some embodiments, plug-n-play module 330 may apply a subset of all possible rules (e.g., plug-n-play module 330 may apply only rule 1 (i.e., step 804) in determining whether to extend features and functionality, omitting steps 806-808). If each subordinate device attribute 1-n meets the criteria of each of the applied rules 1-n, plug-n-play module 330 may establish a communications instance to the subordinate device at step 810 for the purpose of extending features and functionality to the subordinate device. After a communications instance has been established for each of the connected subordinate devices (or not established, if a device attribute fails to satisfy the criteria for a rule), process 800 concludes at step 812.

Figure 8B:
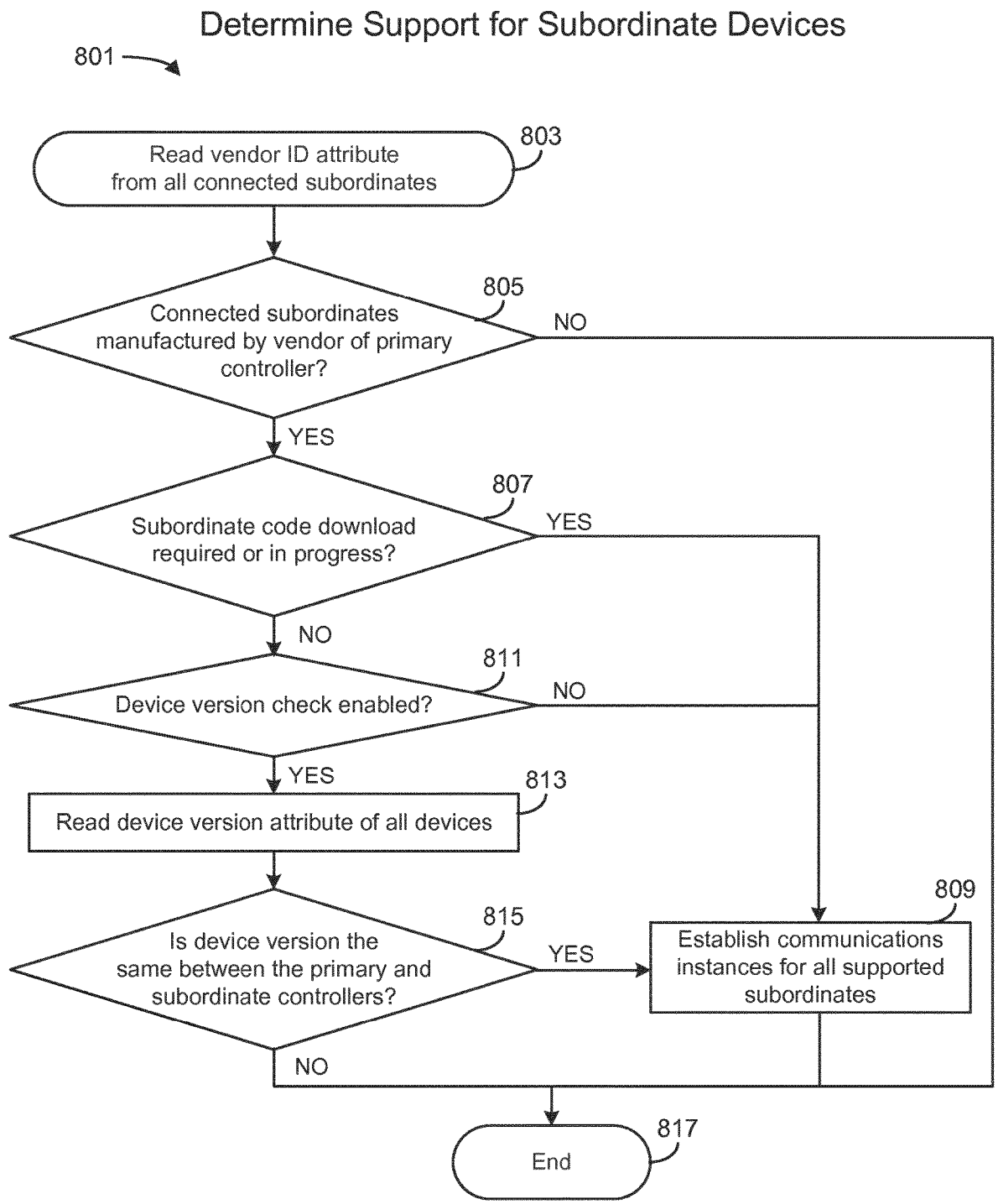
FIG. 8B is another flow diagram illustrating a sub-process of the technique of FIG. 7 used to determine whether to extend support for subordinate devices, according to some embodiments.

Referring now to FIG. 8B, a flowchart of another process 801 for determining whether to extend support to a subordinate device is shown, according to an example embodiment. As described above, process 801 may be a specific embodiment of the general process 800. Process 801 may be performed, among other components, by plug-n-play module 330 of primary controller 302. In some embodiments, process 801 is a sub-process of process 700 (i.e., step 712) described with respect to FIG. 7.

Process 801 may commence with step 803, in which plug-n-play module 330 reads attributes from all connected subordinate devices (e.g., subordinate device 306, subordinate controllers 308-312). In some embodiments, the attributes for the subordinate devices are gathered by module 330 at step 710 of process 700. Subordinate devices may be discovered through the active node table refresh of process 400 or the SE-PnP pinging state machine of process 600. At step 805, plug-n-play module 330 can determine whether the connected subordinates are manufactured by the same manufacturer as primary controller 302. In some embodiments, step 805 is accomplished via detection of a vendor attribute value. If both primary controller 302 and a connected subordinate have the same vendor ID attribute, plug-n-play module 330 can determine that both primary controller 302 and the connected subordinate are manufactured by the same vendor. For example, if primary controller 302 is manufactured by Johnson Controls, primary controller 302 may have a VENDOR_ID_ATTR value of 5 and plug-n-play module 330 can determine whether any of the connected subordinate devices also have a VENDOR_ID_ATTR attribute value of 5. If plug-n-play module 330 determines that the connected subordinate is manufactured by the same manufacturer as the primary controller, process 801 proceeds to step 807. If the subordinate is manufactured by a different entity, process 801 terminates at step 817 without the establishment of an EIOM instance, and thus, without the extension of a communications monitoring link (e.g., EIOM instance) between primary controller 302 and the subordinate device or controller.

In step 807, plug-n-play module 330 can determine whether the a code download is required or in progress for the subordinate device. In some embodiments, plug-n-play module 330 determines whether a code download is required or in progress by reading attributes of the subordinate device (e.g., a system status attribute having potential values of CODE_DOWNLOAD_REQUIRED or CODE_DOWNLOAD_IN_PROGRESS) to determine whether the subordinate device is running bootloader code. As described above, a subordinate device may run in bootloader when it is either missing or in the process of downloading main control code If module 330 determines that the subordinate is not missing or actively downloading main code firmware (i.e., a code download is not required or in progress), process 801 proceeds to step 811. If plug-n-play module 330 determines that the subordinate device is running bootloader code (i.e., a code download is required or in progress), module 330 can create an EIOM instance for the subordinate device at step 809. As described above, an EIOM instance can be tied to the subordinate device's unique MAC address for the purpose of establishing a communications monitoring link with the subordinate device.

In some embodiments, it is preferable to restrict the extension of functionality from a primary controller to subordinate devices to within the same product family. Therefore, at step 811, plug-n-play module 330 can determine whether a device version check is enabled. When the primary controller is manufactured by Johnson Controls, the device version may be referred to as a DMCS version. In some embodiments, the DMCS version may indicate the product family of a device. If the device version check is not enabled, process 801 continues to step 809 to establish an EIOM instance for the subordinate device. However, if the device version check is enabled, process 801 proceeds to step 813, in which module 300 reads the device version (e.g., through use of a DMCS_VERSION_ATTR attribute) from each discovered subordinate device.

After reading the device version of the subordinate device, process 801 continues to step 815, in which plug-n-play module 330 determines whether the device version of the subordinate device (e.g., subordinate devices and controllers 306-312) matches the primary controller 302. In various embodiments, the device version may be a software version, a firmware version, or a device model or product family version. If the versions do not match, primary controller 302 may not be compatible with the subordinate device and will be unable to extend functions (e.g., provisioning functions, control functions, data logging functions, fault detection functions) to the subordinate. In other embodiments, a technician or manager of BMS 300 may wish to restrict the extension of functions from primary controller 302 to only those subordinate devices within a particular product family. Thus, if the versions do not match, process 801 ends at step 817 without extending a communications monitoring link and functionality to the subordinate device. If the versions do match, process 801 proceeds to establish a communications instance (e.g., an EIOM instance) for the subordinate device at step 809. The communications instance may be a medium configured to extend identified functions from the primary controller 302 to the subordinate device. Process 801 then terminates at step 817 and plug-n-play module 330 returns to step 714 of process 700 to extend identified functions to the subordinate device using the instance.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
 a communications bus;
 a plurality of subordinate devices connected to the communications bus; and
 a controller connected to the communications bus;
 wherein the controller is configured to:
  implement a pinging state machine (PSM);
  use the PSM to provide a ping to a subordinate device that is not represented in an active node table;
  update the active node table to include at least one node configured to represent the subordinate device that is not represented in the active node table;
  monitor the active node table for a newly connected subordinate device;
  determine whether the controller and the newly connected subordinate device have a common manufacturer;
  determine a particular type of the newly connected subordinate device, the particular type indicating a building equipment device;
  in response to a determination that the controller and the newly connected subordinate device have a common manufacturer and the determination of the particular type of the newly connected subordinate device, use a set of rules to determine whether the newly connected subordinate device is supported by the controller for performing an identified function in combination with the controller, wherein the identified function is stored in the controller; and
  in response to a determination that the newly connected subordinate device is supported, provide the identified function of the controller to the newly connected subordinate device based on the particular type of the subordinate device, wherein providing the identified function comprises enabling the newly connected subordinate device to perform the identified function;
 wherein providing the identified function of the controller to the newly connected subordinate device comprises providing at least one of scheduling functions, data trending functions, back-up functions, cloning functions, and fault detection functions that enable the subordinate device to perform the identified function.

2. The building management system of claim 1, wherein the newly connected subordinate device is at least one of a sensor, an actuator, a thermostat, an input/output module, and a rooftop unit.

3. The building management system of claim 1, wherein the newly connected subordinate device is a subordinate controller configured to operate at least one secondary subordinate device.

4. The building management system of claim 1, wherein the communications bus is a component of a BACnet network.

5. The building management system of claim 1, wherein the identified function of the controller is at least one of a provisioning function, a control function, a security function, an energy optimization function, and a data logging function.

6. The building management system of claim 1, wherein the controller is further configured to identify the controller and the newly connected subordinate device as a single controller to at least one of the building management system, a cloud service, and a USB device.

7. The building management system of claim 1, wherein the set of rules further comprises a rule for determining whether the controller and the subordinate device have a common version.

8. The building management system of claim 1, wherein the controller is further configured to:
 provide a low-level test message to a MAC address of a subordinate device separate from the plurality of subordinate devices;
 determine that the subordinate device separate from the plurality of subordinate devices is connected to the controller via the communication bus; and
 update the active node table to include at least one node configured to represent the subordinate device separate from the plurality of subordinate devices.

9. The building management system of claim 8, wherein the controller is further configured to provide the low-level test message to each of a plurality of MAC addresses, the plurality of MAC addresses comprising the MAC address, until the correct MAC address is detected.

10. The building management system of claim 1, wherein the controller is further configured to:
in response to the active node table updating to include at least one node configured to represent the subordinate device that is not represented in the active node table, disabling the PSM; and
in response to the active node table being updated, enabling the PSM to continue to ping subordinate devices not represented in the active node table.

11. The building management system of claim 1, wherein providing the identified function of the controller to the newly connected subordinate device comprises providing fault detection functions that allow the subordinate devices to detect faults and provide a notification of the fault to the controller.

12. The building management system of claim 1, wherein providing the identified function of the controller to the newly connected subordinate device comprises providing scheduling functions.

13. The building management system of claim 1, wherein providing the identified function of the controller to the newly connected subordinate device comprises providing a cloning function.

14. A method for extending identified functions of a controller to subordinate devices in a building management system, the method comprising:
providing a low-level test message to a MAC address of a subordinate device separate from a plurality of subordinate devices connected to a communications bus of the building management system;
implementing an active node table comprising a plurality of nodes, each node representing one of the subordinate devices connected to the communications bus;
determining that the subordinate device separate from the plurality of subordinate devices is connected to the controller via the communication bus;
updating the active node table to include at least one node configured to represent the subordinate device separate from the plurality of subordinate devices;
monitoring the active node table for a newly connected subordinate device on the communications bus of the building management system;
determining a particular type of the newly connected subordinate device, the particular type indicating a building equipment device;
in response to the determination of the particular type of the newly connected subordinate device, using a set of rules to determine whether the newly connected subordinate device is supported by the controller for performing an identified function in combination with the controller, wherein the identified function is stored in the controller; and
in response to a determination that the newly connected subordinate device is supported, providing the identified function of the controller to the newly connected subordinate device, wherein providing the identified function comprises enabling the newly connected subordinate device to perform the identified function,
wherein providing the identified function of the controller to the newly connected subordinate device comprises providing at least one of scheduling functions, data trending functions, back-up functions, cloning functions, and fault detection functions that enable the subordinate device to perform the identified function.

15. The method of claim 14, wherein the newly connected subordinate device is at least one of a sensor, an actuator, a thermostat, an input/output module, and a rooftop unit.

16. The method of claim 14, wherein the newly connected subordinate device is a subordinate controller configured to operate at least one secondary subordinate device.

17. The method of claim 14, wherein the communications bus is a component of a BACnet network.

18. The method of claim 14, wherein providing the identified function of the controller to the newly connected device comprises providing at least one of a provisioning function, a control function, a fault detection function, a security function, an energy optimization function, and a data logging function.

19. The method of claim 14, further comprising identifying the controller and the newly connected subordinate device as a single controller to at least one of the building management system, a cloud device, and a USB device.

20. The method of claim 14, wherein the set of rules further comprises a rule for determining whether the primary controller and the subordinate device have a common version.

21. The building management system of claim 14, wherein the method further comprises:
implement a pinging state machine (PSM);
using the PSM to provide a ping to a subordinate device that is not represented in the active node table; and
updating the active node table to include at least one node configured to represent the subordinate device that is not represented in the active node table.

22. A building management system comprising:
a communications bus;
a plurality of subordinate devices connected to the communications bus; and
a controller connected to the communications bus, the controller comprising an active node table comprising a plurality of nodes, each node representing one of the subordinate devices connected to the communications bus;
wherein the controller is configured to:
monitor the active node table for a newly connected subordinate device, wherein the newly connected subordinate device is a subordinate device of the plurality of subordinate devices detected based on a low-level test signal provided by the controller to a MAC address of the subordinate device;
determine whether the controller and the newly connected subordinate device have a common manufacturer;
determine a particular type of the newly connected subordinate device, the particular type indicating a building equipment device;
in response to a determination that the controller and the newly connected subordinate device have a common manufacturer and the determination of the particular type of the newly connected subordinate device, use a set of rules to determine whether the newly connected subordinate device is supported by the controller for performing an identified function in combination with the controller, wherein the identified function is stored in the controller; and
in response to a determination that the newly connected subordinate device is supported, provide the identified function of the controller to the newly connected subordinate device based on the particular type of the subordinate device, wherein providing the identified function to the newly connected subordinate device comprises enabling the newly connected subordinate device to perform the identified function;
wherein the identified function comprises provisioning functions and fault detection functions, the fault detection functions enabling the subordinate devices to detect faults and provide a notification of the fault to the controller.

* * * * *